(12) United States Patent
Oliveira

(10) Patent No.: US 11,492,923 B2
(45) Date of Patent: Nov. 8, 2022

(54) ICE SHEDDING AIRCRAFT ENGINE

(71) Applicant: Gulfstream Aerospace Corporation, Savannah, GA (US)

(72) Inventor: Guilherme Oliveira, Savannah, GA (US)

(73) Assignee: Gulfstream Aerospace Corporation

( * ) Notice: Subject to any disclaimer, the term of this patent is extended or adjusted under 35 U.S.C. 154(b) by 135 days.

(21) Appl. No.: 16/378,362

(22) Filed: Apr. 8, 2019

(65) Prior Publication Data

US 2019/0309652 A1 Oct. 10, 2019

Related U.S. Application Data

(60) Provisional application No. 62/654,999, filed on Apr. 9, 2018.

(51) Int. Cl.
| | |
|---|---|
| *F01D 25/02* | (2006.01) |
| *B64D 15/16* | (2006.01) |
| *B64D 33/02* | (2006.01) |
| *F04D 29/32* | (2006.01) |
| *F01D 5/14* | (2006.01) |

(52) U.S. Cl.
CPC ............ *F01D 25/02* (2013.01); *B64D 15/16* (2013.01); *B64D 2033/0233* (2013.01); *F01D 5/147* (2013.01); *F04D 29/324* (2013.01); *F05D 2260/607* (2013.01)

(58) Field of Classification Search
CPC .... B64D 2033/0233; B64D 15/00–166; F01D 25/02; F01D 5/145; F01D 5/141; F01D 5/147; F03D 80/40; F04D 29/324; F04D 29/325; F04D 29/38; F04D 29/384; F04D 29/388

See application file for complete search history.

(56) References Cited

U.S. PATENT DOCUMENTS

| | | | | |
|---|---|---|---|---|
| 3,794,444 | A | * 2/1974 | Campbell | ............... F01D 25/02 |
| | | | | 416/201 R |
| 4,128,363 | A | * 12/1978 | Fujikake | ............... F04D 19/002 |
| | | | | 416/236 A |
| 4,907,765 | A | * 3/1990 | Hirschel | ............... F15D 1/0035 |
| | | | | 244/200 |
| 7,374,404 | B2 | 5/2008 | Schilling | |
| 7,914,259 | B2 | * 3/2011 | Godsk | ................... F03D 1/0641 |
| | | | | 416/146 R |

(Continued)

FOREIGN PATENT DOCUMENTS

| | | |
|---|---|---|
| CN | 103057691 A | 4/2013 |
| CN | 106870452 A | 6/2017 |

(Continued)

*Primary Examiner* — Richard A Edgar
*Assistant Examiner* — Behnoush Haghighian
(74) *Attorney, Agent, or Firm* — LKGlobal | Lorenz & Kopf, LLP

(57) ABSTRACT

According to the present teachings, an aircraft engine configured to controllably shed ice during icing conditions is presented. The engine has a member operating at a first angular velocity having a surface divided into a first ice accumulating surface configured to collect ice, and a first shadow surface configured to resist the collection of ice. A first flange is disposed between the first ice accumulating surface and the first shadow surface.

10 Claims, 3 Drawing Sheets

(56) References Cited

U.S. PATENT DOCUMENTS

| | | | | |
|---|---|---|---|---|
| 8,033,789 B2* | 10/2011 | Read | ............... | F04D 29/324 |
| | | | | 416/95 |
| 8,245,981 B2* | 8/2012 | Rainous | ............. | B64D 15/00 |
| | | | | 244/200.1 |
| 8,770,512 B2* | 7/2014 | Flemming | ............ | B64D 33/02 |
| | | | | 244/53 B |
| 9,624,782 B2* | 4/2017 | Booth | ............. | F01D 5/30 |
| 10,107,302 B2* | 10/2018 | Berschback | ......... | F04D 29/542 |
| 10,487,796 B2* | 11/2019 | Tobin | ............. | F03D 1/0633 |
| 2003/0012653 A1* | 1/2003 | Diemunsch | ......... | F04D 29/023 |
| | | | | 416/193 R |
| 2008/0075593 A1 | 3/2008 | Read et al. | | |
| 2009/0272850 A1* | 11/2009 | Rainous | ............. | F02C 7/047 |
| | | | | 244/134 E |
| 2012/0181389 A1 | 7/2012 | Flemming et al. | | |
| 2012/0312924 A1* | 12/2012 | Rainous | ............. | B64D 15/00 |
| | | | | 244/134 E |
| 2013/0255796 A1* | 10/2013 | Dimascio | ............. | F16S 5/00 |
| | | | | 137/334 |
| 2016/0010466 A1* | 1/2016 | Lamson | ............. | F01D 9/041 |
| | | | | 60/772 |
| 2017/0167510 A1* | 6/2017 | Berschback | ............. | F01D 9/04 |
| 2018/0283180 A1* | 10/2018 | Jain | ............. | F01D 25/02 |

FOREIGN PATENT DOCUMENTS

| | | |
|---|---|---|
| GB | 2472053 A | 1/2011 |
| WO | 2017187073 A1 | 11/2017 |

* cited by examiner

US 11,492,923 B2

ICE SHEDDING AIRCRAFT ENGINE

CROSS-REFERENCE TO RELATED APPLICATIONS

This application claims the benefit of U.S. Provisional Patent Application No. 62/654,999 filed Apr. 9, 2018, the disclosure of which is incorporated by reference in its entirety.

TECHNICAL FIELD

The present disclosure relates generally to an aircraft engine, and more particularly to an aircraft engine subjected to ice buildup, having structures to facilitate the controlled shedding of the ice buildup.

BACKGROUND

This section provides background information related to the present disclosure that is not necessarily prior art. Aircraft engines are subjected to ice buildup under predetermined loads, pressures, and temperatures. This ice can often build up on rotating components which can adversely affect system dynamics by the increase of the ice mass. Further, because this ice buildup is often released unpredictably at times, and varying masses, the unbalancing of engine components can be thrown off leading to undesirable vibrations. It is an object of the invention to overcome these and other undesirable features.

SUMMARY

According to the present teachings, an aircraft engine configured to controllably shed ice during icing conditions is presented. The engine is subjected to ice buildup under predetermined loads, pressures, and temperatures. The engine has a member rotating at a first angular velocity about a rotational axis aligned with a flow direction. The member has a surface divided into an ice-accumulating surface configured to collect ice, and a shadow surface configured to resist the collection of ice. A flange is disposed between the ice accumulating surface and the shadow surface. The flange has an ice-accepting surface, which intersects the ice-accumulating surface and which together define an ice capturing volume proximate the ice-accumulating surface. The ice accepting surface and ice accumulating surface incrementally captures ice within the ice capturing volume from gasses passed through the engine.

According to an alternate teaching, when a predetermined mass of ice is captured within the ice capturing volume, and the predetermined mass of ice is subjected to a first centrifugal force caused by rotation of the member, the predetermined mass of ice is subjected to shear stresses along an interface between the mass of ice and the member. The shear stress overcomes an adhesive force of the mass of ice, and the ice is shed from the ice-accumulating surface.

According to an alternate teaching, the aircraft engine of the previous paragraphs can include a second flange disposed between a second ice accumulating surface and a second shadow surface. The second flange can have a second ice-accepting surface that intersects the second ice-accumulating surface that together define a second ice capturing volume above the second ice-accumulating surface which is smaller than the previously described ice-accumulating volume. The second ice accepting surface and second ice accumulating surface incrementally captures ice within the second ice capturing volume and shed the accumulated ice at a time which is different than the shedding of the previously described ice-accumulating volume.

According to an alternate teaching, an aircraft engine subjected to ice buildup is presented. The engine includes a member rotating at a first angular velocity about a rotational axis transverse to the flow direction. The member has a surface divided into a first ice accumulating surface configured to collect ice, and a first shadow surface configured to resist the collection of ice. A generally V-shaped flange is disposed between the first ice accumulating surface and the first shadow surface. The generally V-shaped flange has a pair of ice accepting surfaces that intersect the first ice-accumulating surface and defines an ice capturing volume above the first ice-accumulating surface. The first ice accepting surface and first ice accumulating surface incrementally capture ice within the ice capturing volume.

The aircraft engine according to the previous paragraph where a first predetermined mass of ice is captured within the ice capturing volume and the predetermined mass of ice is subjected to a centrifugal force when the member is rotated about the rotational axis at the first angular velocity. The first predetermined mass of ice being subjected to releasing shear forces and shed from the first ice-accumulating surface when subjected to the centrifugal force caused by rotation of the mass of ice at the angular velocity.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The present disclosure will now be described more fully with reference to figures in which various embodiments of the invention are shown. The subject matter of this disclosure may, however, be embodied in many different forms and should not be construed as being limited to the embodiments set forth herein. While embodiments of the invention relate to engine configurations that include a bypass flow around the engine, an expanded design space may include other rotating engine components subjected to icing, and engines configured to travel at supersonic and subsonic speeds.

Figure 1:
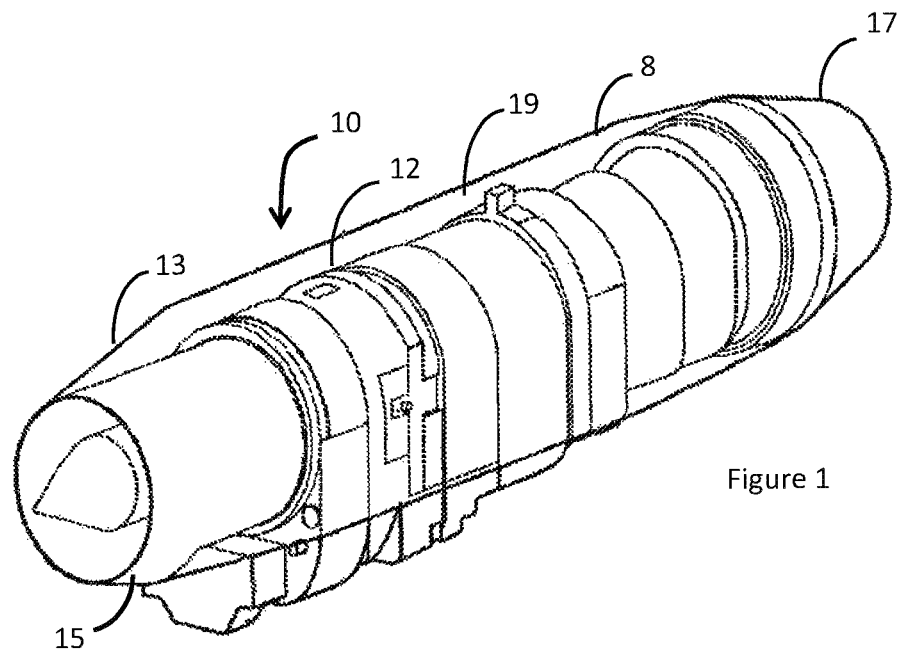
FIG. 1 is a perspective view illustrating a nacelle having a non-limiting embodiment of an ice shedding engine according to the present teachings.

Referring to FIG. 1, a propulsion system 10 is presented. Propulsion system 10 includes an engine 12 covered by a nacelle 8 (nacelle 8 is transparent in FIG. 1). Engine 12 has rotatable blades or members 14 (as best seen in FIGS. 2-5) that are subjected to icing during flight. Nacelle 8 includes a cowl 13, the front end of which acts as an air intake, and which, under predetermined loads, pressures, and temperatures, facilitates the freezing of atmospheric water. As described below, this freezing atmospheric water is intentionally collected in a manner that will allow for the controlled shedding of ice to minimize the mass of ice shed. Further, the ice shedding in the engine is timed to shed ice in a manner that will decrease vibration due to offset masses from collected ice. The nacelle 10 also includes an inlet module 15 and a nozzle module 17. In accordance with embodiments of the invention, a nacelle bypass 19 may be configured to bypass flow around the engine 12 from the inlet 15 to the nozzle 17.

Figure 2:
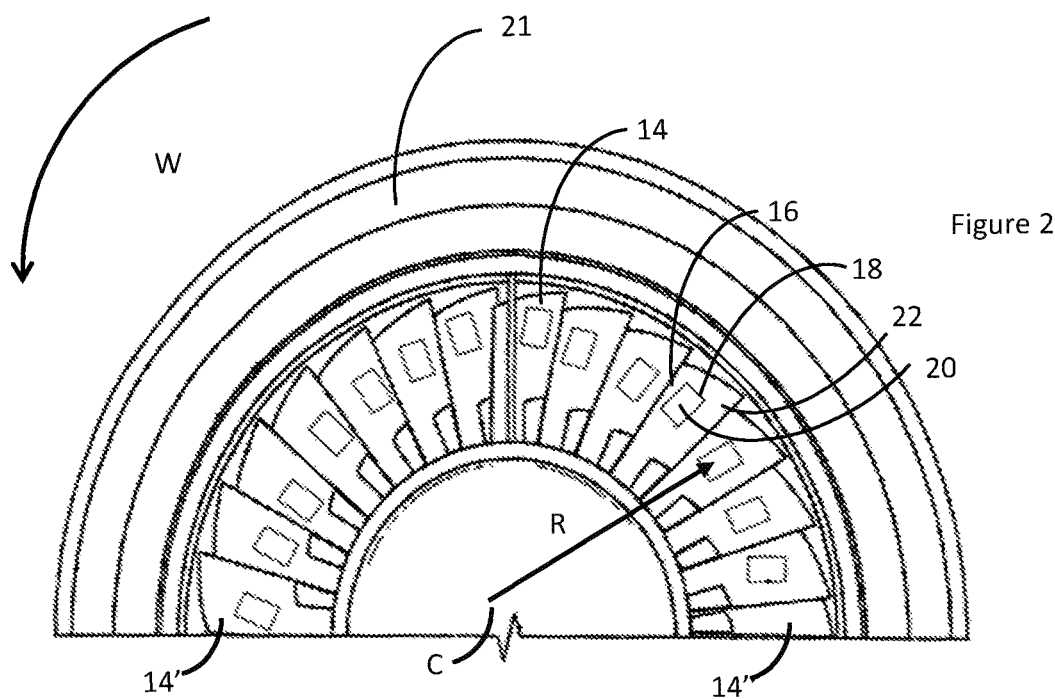
FIG. 2 is a fragmented, axial view illustrating an engine fan of the ice shedding engine depicted in FIG. 1.

As shown in FIG. 2, contrary to the traditional engine fan blade assembly 21, the rotatable blades 14 have flanges 16 that project generally perpendicular to the engine airflow and surfaces on the rotatable blade 14 to collect accumulated ice. As shown, these flanges 16 are positioned and sized in a manner that opposing blades within the engine will have the same configuration to allow simultaneous shedding of accumulated ice. As described below, by varying the height of the flanges 16 off the blade surface and radial position R of the flanges with respect to an axis of rotation of the blades C, allows an engineered timing of the release or shedding of varying masses of accumulated ice. The rotatable engine fan member 14 has the compression side surface divided into a first ice accumulating surface 20 configured to collect ice, and a first shadow surface 22 configured to resist or be shielded from the collection of ice by the flange.

Figure 3:
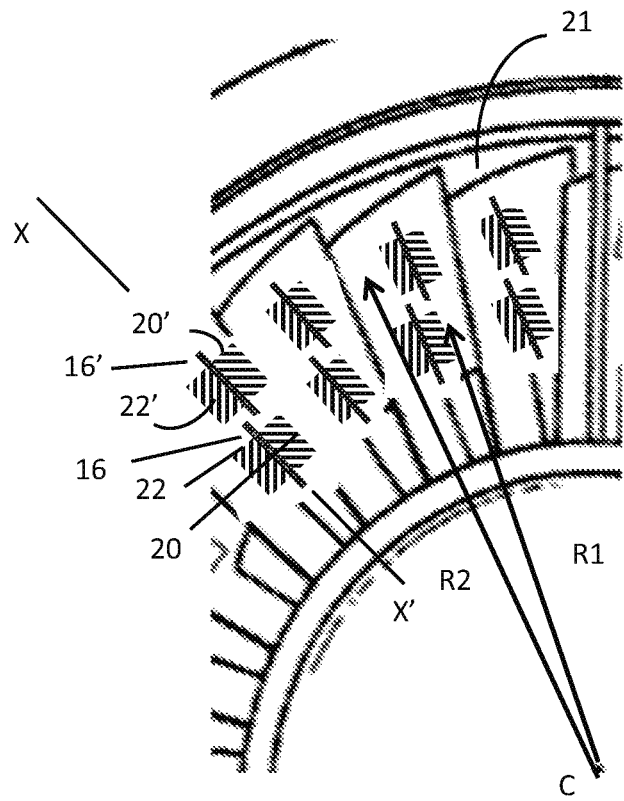
FIG. 3 is an expanded, fragmented, axial view illustrating the engine fan shown in FIG. 2 having a non-limiting embodiment of the ice shedding features according to the present teachings.

FIG. 3 represents a view of the rotatable engine fan member 14, which is rotating clockwise, shown in FIG. 2 having the ice shedding features according to the present teachings. The rotatable engine fan member 14 is subjected to ice buildup under predetermined loads, pressures, and temperatures. Further, the rotatable engine fan member 14 is rotated at a first angular velocity about the axis of rotation of the blades C in a flow direction. This rotatable engine fan member 14 has a surface 18 divided into the first ice accumulating surface 20 configured to collect ice, and the shadow surface 22 configured to resist the collection of ice.

A plurality of flanges 16 and 16' are disposed between the ice accumulating surfaces 20 and 20' and the shadow surfaces 22 and 22'. These flanges 16 and 16' can have varying heights and radial locations that can be located during the fan blade assembly 21 to adjust the amount and centroid location of ice accumulated. This adjusts the amount of centrifugal forces needed to shed the accumulated ice.

The first flange has a first height and aspect ratio and a first axis X and second flange has a second height and aspect ratio and a second axis X'. Optionally, the first axis and second axis can intersect, e.g. at about 90 degrees. Optionally, the first and second axis can be parallel. The first ice-accepting surface 20 of the flange 16 can be generally perpendicular or angled to the rotational direction of the flange assembly 21

Figure 4:
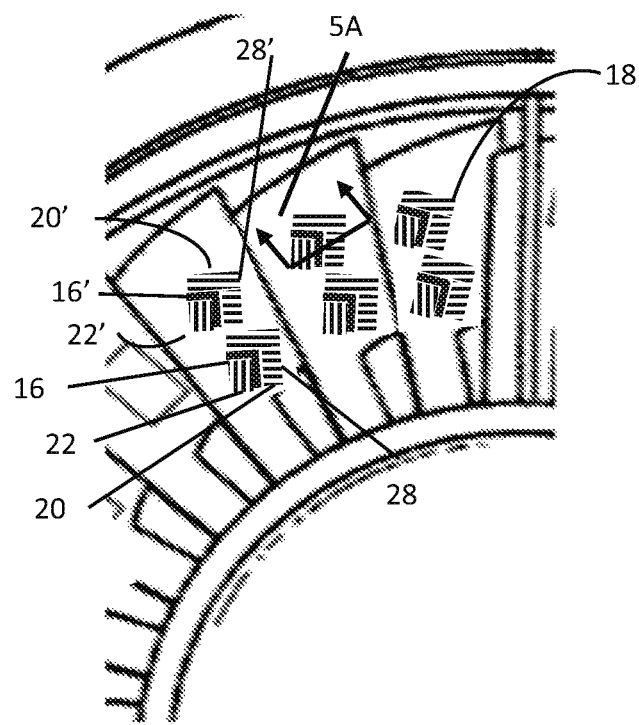
FIG. 4 is a fragmented, axial view of the engine fan shown in FIG. 2 having another non-limiting embodiment of the ice shedding features according to the present teachings.
Figure 5A:
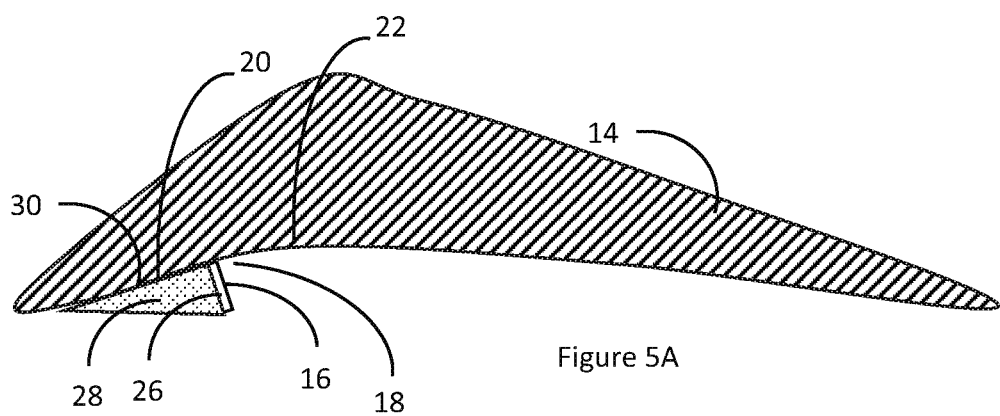
FIGS. 5A and 5B are sectional and top views, respectively, illustrating the engine fan shown in FIG. 4 having the ice shedding features according to the present teachings.
Figure 5B:
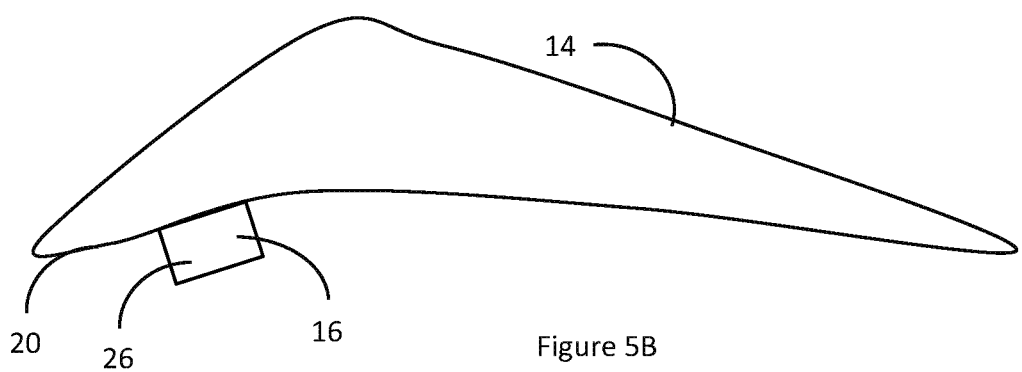

As shown in FIGS. 4-5B, V-shaped flanges 16 and 16' are disposed between the first and second ice accumulating surfaces 20 and 20' and the first and second shadow surfaces 22 and 22'. FIG. 4 includes the positioning of two flanges 16 and 16' to form a V-shaped flange configuration. The first and second flanges 16 and 16' have second ice accepting surfaces 26 and 26' which intersect the second ice accumulating surfaces 20 and 20' to define a ice capturing volume 28' above the second ice accumulating surface 20'. As described above, the second ice accepting surface 26' and second ice accumulating surface 20' incrementally capture ice within the second ice capturing volumes 28 and 28'.

A second predetermined mass of ice is captured within the second ice capturing volume 28' and the second predetermined mass of ice is subjected to a second centrifugal force. When the fan blade 16 is rotating at the first angular velocity and the accumulating second ice mass reaches a critical predetermined value, the second predetermined mass of ice is shed from the second ice-accumulating surface. The second ice accepting surface 26' and second ice accumulating 20' incrementally captures ice within the second ice capturing volume 26' and shed the accumulated ice at a time which is different than the shedding of the previously described ice-accumulating volume.

Because of varying heights of the flanges 16, 16', the first volume of collected ice has a first centroid at a first radius from the axis of rotation of the blades C and the second volume of collected ice has a second centroid at a second radius from the axis of rotation of the blades C, the second radius being different than the first radius. These differences can be used to tune the predetermined masses which will be shed for a given engine angular velocity.

FIGS. 5A and 5B represent sectional and top views of the rotatable member 14 shown in FIG. 4. The flange 16 has a first ice-accepting surface 26 that intersects the ice-accumulating surface 20 and defines the first ice capturing volume 28 above the ice-accumulating surface 20. Rotation of the rotatable engine fan member 14 causes the first ice accepting surface 22 and first ice accumulating surface 20 to incrementally capture ice within the first ice capturing volume 26. The generally V-shaped flange 16 is disposed between the first ice accumulating surface and the first shadow surface and has a pair of ice accepting surfaces which intersects the When a first predetermined mass of ice is captured within the ice capturing volume 28 and the predetermined mass of ice is subjected to a centrifugal force, the first predetermined mass of ice being shed from the first ice accumulating surface 20. In this regard, and the predetermined mass of ice is subjected to the first centrifugal force, the predetermined mass of ice is subjected to shear stresses along an interface between the mass of ice and the surfaces 20, 26. The shear stress overcomes an adhesive force of the mass of ice, and the ice is shed from the ice-accumulating surface.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aircraft engine comprising:
a fan blade assembly comprising a plurality of blades that each include a flange configuration disposed thereon in which at least two of the blades have a corresponding flange configuration disposed thereon that is different than the other corresponding flange configuration on the other of the at least two of the blades, wherein the at least two blades includes a first blade and a second blade, and wherein:
the first blade configured to rotate at an angular velocity about a rotational axis to produce a first flow direction of air adjacent to the first blade, the first blade having a first compression surface divided into a first ice accumulating surface and a first shadow surface;
a first flange disposed between the first ice accumulating surface and the first shadow surface and extending away from the first blade transverse to the first flow direction to define a first ice accepting surface which intersects the first ice accumulating surface and defines a first ice capturing volume above the first ice accumulating surface, wherein the first ice accepting surface and the first ice accumulating surface are configured to incrementally capture ice from water in the air within the first ice capturing volume as the first blade rotates, wherein the first shadow surface is shielded by the first flange to resist collection of ice from water in the air, wherein the first flange forms at least part of a first flange configuration that is disposed on the first compression surface;
the second blade disposed adjacent to the first blade and configured to rotate at the angular velocity about the rotational axis to produce a second flow direction of air adjacent to the second blade, the second blade having a second compression surface divided into a first additional ice accumulating surface and a first additional shadow surface; and
a first additional flange disposed between the first additional ice accumulating surface and the first additional shadow surface and extending away from the second blade transverse to the second flow direction to define a first additional ice accepting surface which intersects the first additional ice accumulating surface and defines a first additional ice capturing volume above the first additional ice accumulating surface, wherein the first additional ice accepting surface and the first additional ice accumulating surface are configured to incrementally capture ice from water in the air within the first additional ice capturing volume as the second blade rotates, and wherein the first additional shadow surface is shielded by the first additional flange to resist collection of ice from water in the air, wherein the first additional flange forms at least part of a first additional flange configuration that is disposed on the second compression surface, and wherein the first flange configuration is different than the first additional flange configuration including the first flange having at least one of a height and a radial position R with respect to the axis of rotation that is different than the first additional flange and any other flange, if present, anywhere on the second compression surface of the second blade.

2. The aircraft engine according to claim 1, wherein when ice incrementally captured within the first ice capturing volume reaches a first predetermined mass of ice as the blade rotates, the first predetermined mass of ice is subjected to a first centrifugal force that sheds the first predetermined mass of ice from the first ice accumulating surface.

3. The aircraft engine according to claim 2 wherein the compression surface is further divided into a second ice accumulating surface, and wherein the aircraft engine further comprises a second flange disposed between the second ice accumulating surface and the second shadow surface extending away from the blade transverse to the flow direction to define a second ice accepting surface which intersects the second ice accumulating surface and defines a second ice capturing volume above the second ice accumulating surface, wherein the second ice accepting surface and the second ice accumulating surface are configured to incrementally capture ice from water in the air within the second ice capturing volume as the blade rotates, and wherein the second shadow surface is shielded by the second flange to resist collection of ice from water in the air.

4. The aircraft engine according to claim 3, wherein when ice incrementally captured within the second ice capturing volume reaches a second predetermined mass of ice as the blade rotates, the second predetermined mass of ice is subjected to a second centrifugal force that sheds the second predetermined mass of ice from the second ice accumulating surface.

5. The aircraft engine according to claim 4 wherein the first predetermined mass of ice has a first centroid at a first radius from the rotational axis and the second predetermined mass of ice has a second centroid at a second radius from the rotational axis, the second radius being different than the first radius.

6. The aircraft engine according to claim 4, wherein the first flange extends along a first portion of the compression surface to define a first axis, wherein the second flange extends a second portion of the compression surface to define a second axis, and wherein the first and second axes intersect.

7. The aircraft engine according to claim 6, wherein the first and second axis intersect to define an angle of 90 degrees.

8. The aircraft engine according to claim 4, wherein the first flange extends along a first portion of the compression surface to define a first axis, wherein the second flange extends along a second portion of the compression surface to define a second axis, and wherein the first and second axes are parallel.

9. The aircraft engine according to claim 1, wherein the first ice accepting surface is perpendicular to the flow direction of the air adjacent to the blade.

10. The aircraft engine according to claim 1, wherein the fan blade assembly further comprising:

a third blade disposed opposite the first blade and configured to rotate at the angular velocity about the rotational axis to produce a third flow direction of air adjacent to the third blade, the third blade having a third compression surface divided into a third ice accumulating surface and a third shadow surface; and a third flange disposed between the third ice accumulating surface and the third shadow surface and extending away from the third blade transverse to the third flow direction to define a third ice accepting surface which intersects the third ice accumulating surface and defines a third ice capturing volume above the third ice accumulating surface, wherein the third ice accepting surface and the third ice accumulating surface are configured to incrementally capture ice from water in the air within the third ice capturing volume as the third blade rotates, and wherein the third shadow surface is shielded by the third flange to resist collection of ice from water in the air, wherein the third flange forms at least part of a third flange configuration that is disposed on the third compression surface, and wherein the third flange configuration is same as the first flange configuration including the third flange having both a height and a radial position R with respect to the axis of rotation that is same as the first flange.

* * * * *